United States Patent
Saito et al.

(10) Patent No.: US 9,436,415 B2
(45) Date of Patent: Sep. 6, 2016

(54) PRINT CONTROL APPARATUS, PRINT SYSTEM, PRINT CONTROL METHOD, AND NON-TRANSITORY COMPUTER READABLE MEDIUM

(71) Applicant: FUJI XEROX CO., LTD., Tokyo (JP)

(72) Inventors: Yasushi Saito, Kanagawa (JP); Takeshi Naminoue, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/702,144

(22) Filed: May 1, 2015

(65) Prior Publication Data

US 2016/0170690 A1    Jun. 16, 2016

(30) Foreign Application Priority Data

Dec. 15, 2014    (JP) ................................ 2014-253408

(51) Int. Cl.
     *G06F 3/12*          (2006.01)

(52) U.S. Cl.
     CPC ............ *G06F 3/1208* (2013.01); *G06F 3/121* (2013.01); *G06F 3/125* (2013.01); *G06F 3/1234* (2013.01)

(58) Field of Classification Search
     USPC ........................................................ 358/1.15
     See application file for complete search history.

(56) References Cited

U.S. PATENT DOCUMENTS

| | | | | |
|---|---|---|---|---|
| 5,684,934 A | * | 11/1997 | Chen ...................... | G06F 3/121 358/1.14 |
| 6,386,696 B1 | * | 5/2002 | Rodi ..................... | G03G 15/169 347/103 |
| 6,388,760 B2 | * | 5/2002 | Kadota ................... | G06F 3/121 358/1.13 |
| 8,305,615 B2 | * | 11/2012 | Kanno .................... | G06F 3/121 358/1.14 |
| 9,001,354 B2 | * | 4/2015 | Enomoto ........... | H04N 1/00209 358/1.12 |
| 2006/0029419 A1 | * | 2/2006 | Shiraki .............. | G03G 21/1857 399/111 |

FOREIGN PATENT DOCUMENTS

| | | |
|---|---|---|
| JP | 2005-196654 A | 7/2005 |
| JP | 2008-230183 A | 10/2008 |
| JP | 2009-57141 A | 3/2009 |
| JP | 2010-36547 A | 2/2010 |

\* cited by examiner

*Primary Examiner* — Ngon Nguyen
(74) *Attorney, Agent, or Firm* — Sughrue Mion, PLLC (57) ABSTRACT

A print control apparatus includes a print instruction unit that instructs a printer to print data on a medium, and a resume instruction unit that, in response to an interruption occurring in a printing operation after the printer has printed a first portion of the print data onto the medium, instructs the printer to start resuming the printing operation subsequent to a clearance of the interruption with the printing operation of a third portion of the print data subsequent to a second portion onto the medium if a predetermined condition to validate the printing operation of the second portion of the print data subsequent to the first portion is satisfied.

11 Claims, 11 Drawing Sheets

| PROCESS ID | PROCESS NAME | PAGE COUNT | SHEET SIZE | RECEPTION TIME | PRINT STATUS |
|---|---|---|---|---|---|
| 0001 | AAA | 10000 | 15 × 11 | 08:30:000 | PRINTED |
| 0002 | BBB | 50000 | 15 × 8 | 10:00:000 | PRINTING |
| 0003 | CCC | 5000 | 13 × 10 | 15:00:000 | WAITING |

FIG. 8

| SHEET NAME | SHEET SIZE | CORRECTED PAGE COUNT |
|---|---|---|
| SHEET A | 15 × 11 | 5 |
| SHEET B | 15 × 8 | 8 |
| SHEET C | 13 × 10 | 6 |

| DEVICE NAME | DEVICE ADDRESS | INTRA-DEVICE DISTANCE |
|---|---|---|
| DEVICE A | 100.100.100.1 | 50 |
| DEVICE B | 100.100.100.10 | 80 |
| DEVICE C | 100.100.100.50 | 45 |

FIG. 13

PRINT CONTROL APPARATUS, PRINT SYSTEM, PRINT CONTROL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-253408 filed Dec. 15, 2014.

BACKGROUND

1. Technical Field

The present invention relates to a print control apparatus, a print system, a print control method, and a non-transitory computer readable medium.

2. Summary

According to an aspect of the invention, there is provided a print control apparatus. The print control apparatus includes a print instruction unit that instructs a printer to print data on a medium, and a resume instruction unit that, in response to an interruption occurring in a printing operation after the printer has printed a first portion of the print data onto the medium, instructs the printer to start resuming the printing operation subsequent to a clearance of the interruption with the printing operation of a third portion of the print data subsequent to a second portion onto the medium if a predetermined condition to validate the printing operation of the second portion of the print data subsequent to the first portion is satisfied.

BRIEF DESCRIPTION OF THE DRAWINGS

Exemplary embodiments of the present invention will be described in detail based on the following figures, wherein.

DETAILED DESCRIPTION

Embodiments of the present invention are described with reference to the drawings.

Figure 1:
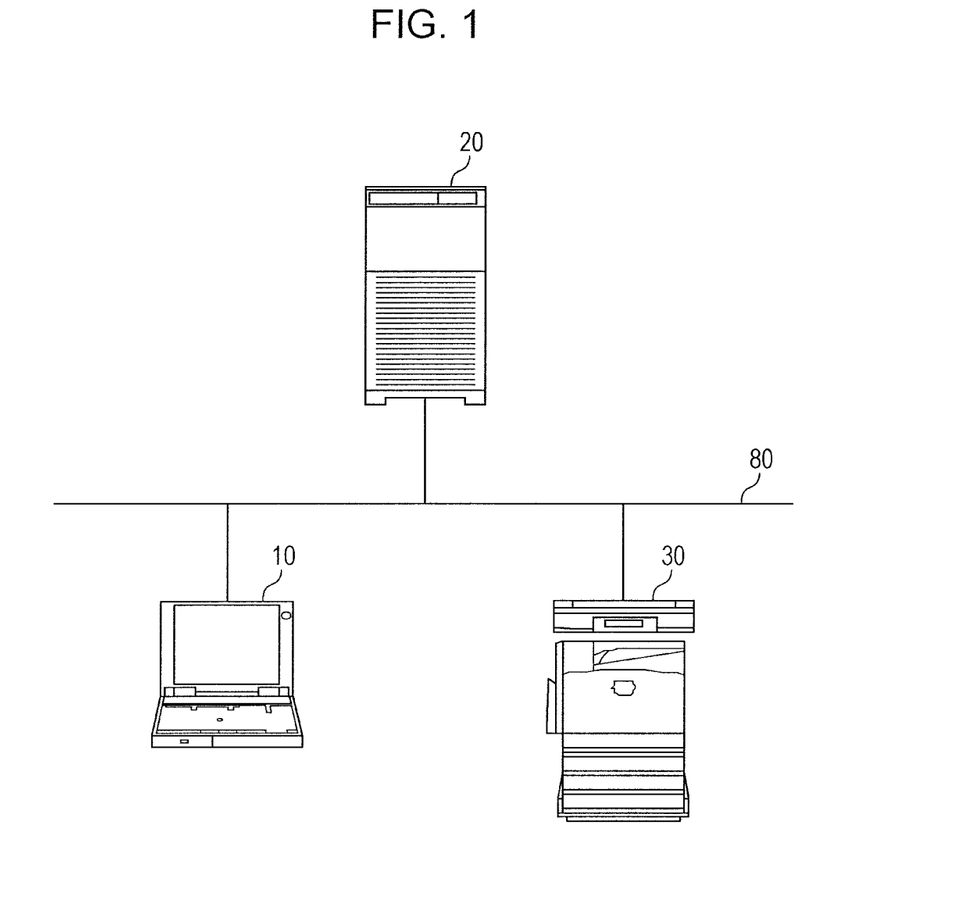
FIG. 1 generally illustrates an image forming system of an exemplary embodiment of the present invention.

FIG. 1 generally illustrates an image forming system of an exemplary embodiment of the present invention. Referring to FIG. 1, the image forming system includes a terminal apparatus 10, a print server 20, an image forming apparatus 30, and a communication network 80 connecting these elements. FIG. 1 illustrates the terminal apparatus 10, the print server 20, and the image forming apparatus 30. Alternatively, multiple terminal apparatuses 10, print servers 20, and image forming apparatuses 30 may be included in the image forming system.

The terminal apparatus 10 is a computer that executes an application program and transmits to the print server 20 print target data created and retrieved by the application program (hereinafter referred to as "print data"). The terminal apparatus 10 may be a personal computer (PC).

The print server 20 is a computer that receives the print data from the terminal apparatus 10, generates data used to instruct the image forming apparatus 30 to print (hereinafter referred to as "print instruction data"), and then transmits the print instruction data to the image forming apparatus 30. The print instruction data is page description language (PDL) data, for example. The print server 20 may be a specialized print server, or a general-purpose computer, such as a PC. In the exemplary embodiment, the print server 20 is an example of a print control apparatus in the exemplary embodiment of the present invention.

The image forming apparatus 30 receives the print instruction data from the print server 20, and forms an image responsive to the print instruction data onto a medium such as a paper sheet. In the discussion that follows, the image forming apparatus 30 is a continuous feed printing apparatus that prints an image on a continuous paper sheet. But the print server 20 may be a standard printer that prints an image on cut paper sheets. The image forming apparatus 30 is an example of a printer in the exemplary embodiment of the present invention.

The communication network 80 is a communication medium for use in communications between the terminal apparatus 10 and the print server 20 and between the print server 20 and the image forming apparatus 30. The communication network 80 may be a local area network (LAN), for example.

Figure 2:
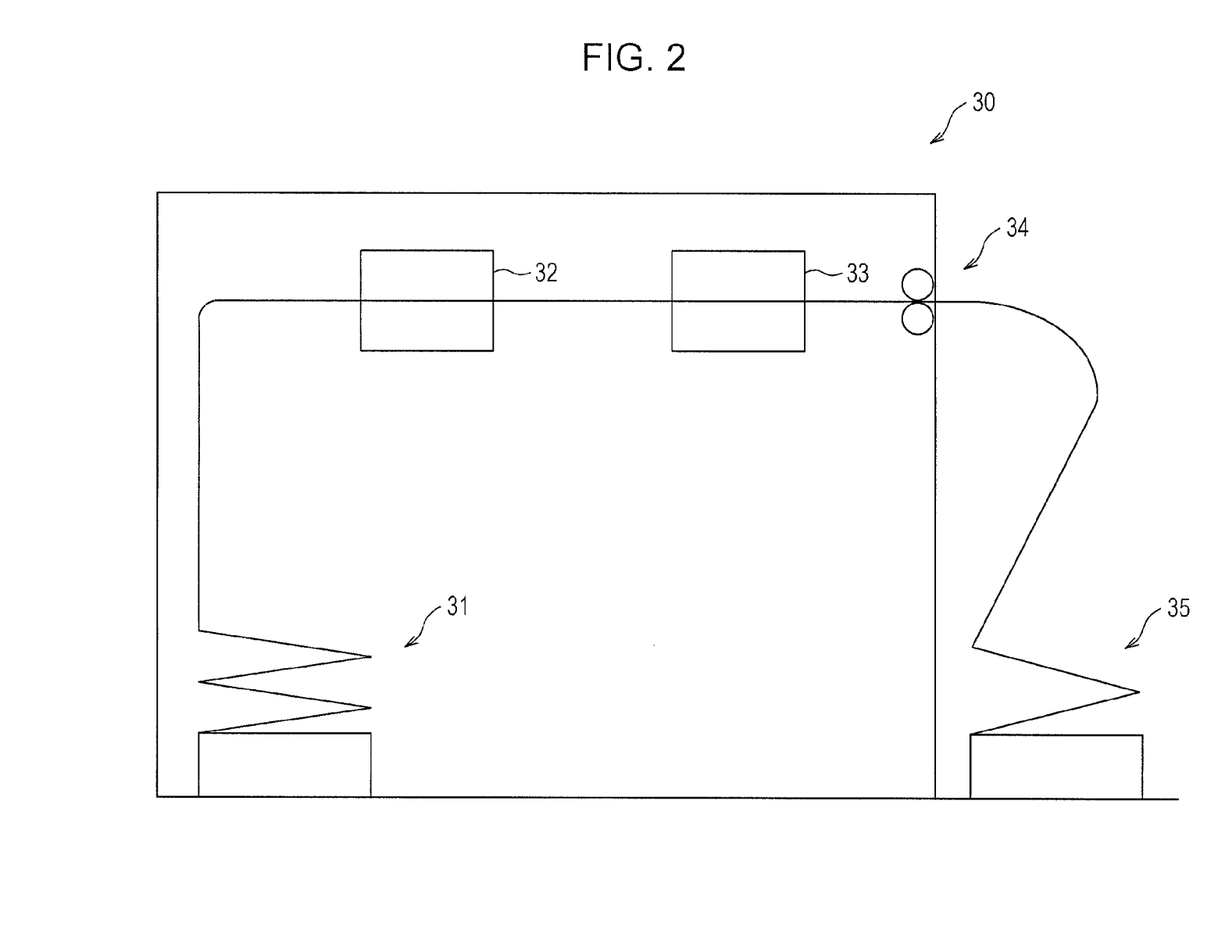
FIG. 2 illustrates a configuration of an image forming apparatus in the exemplary embodiment of the present invention.

FIG. 2 illustrates a configuration of the image forming apparatus 30 of FIG. 1. Referring to FIG. 2, the image forming apparatus 30 includes a sheet tray 31, a transfer unit 32, a fixing unit 33, a sheet discharging unit 34, and a stacker 35. More precisely, the image forming apparatus 30 includes an image forming unit and the like to form an image that is to be transferred to a paper sheet by the transfer unit 32. The image forming unit is not directly involved in the discussion of the exemplary embodiment, and is not illustrated herein.

The sheet tray 31 holds the paper sheet. FIG. 2 illustrates a single sheet tray 31. But multiple sheet trays 31 different depending on sheet size may be employed.

The transfer unit 32 transfers to the paper sheet a toner image as an example of an image of a printing agent formed on the image forming unit (not illustrated) in response to the print instruction data transmitted from the print server 20. For example, a transfer electric field formed by a transfer roller electrostatically transfers the toner image onto the paper sheet at a time.

The fixing unit 33 fixes the toner image transferred onto the paper sheet by the transfer unit 32 to the paper sheet. The toner image is thus formed on the paper sheet. For example, when the paper sheet having the toner image transferred thereon is transported through the nip between a pressure roller and a heater roller, the toner image is fixed onto the paper sheet through a fixing process by heat and pressure.

The sheet discharging unit 34 discharges the paper sheet that has undergone image forming. The printed paper sheet is thus discharged by a transport roller.

The stacker 35 stacks the paper sheet discharged by the sheet discharging unit 34.

The printing operation may be interrupted on the image forming apparatus 30 for any reason, and may resume after the cause of the interruption is removed. The image forming apparatus 30 typically continues the printing operation through a recovery function. If the image forming apparatus 30 is a continuous feed printing apparatus, the printing operation resumes on a next page subsequent to a printed page since it is typically guaranteed that a page the sheet discharging unit 34 has discharged to the stacker 35 is printed (hereinafter referred to as a "printed page"). Even if there are valid printed pages from a page the transfer unit 32 has transferred the image (hereinafter referred to as a "transfer complete page") to the printed page depending on the printing state, duplicate printing in which the contents of the printed pages are printed again may occur.

In the exemplary embodiment, an alarm triggered by the image forming apparatus 30 is detected on a print port. A function of acquiring the printed page count at that moment and a function of correcting the printed page count are added to the print server 20. The printing operation thus resumes on a page next to the printed page with the page count corrected. In this way, the printing system free from duplicate printing in the recovery operation is thus implemented.

In a method of correcting the printed page count, a fixed page count from the page the transfer unit 32 has completed the transfer operation to a page the sheet discharging unit 34 has discharged may be added. Depending on the type of alarm, the printing operation should resume on a page next to the printed page. In such a case, page missing may take place.

In the function of the exemplary embodiment the print port detects the alarm triggered in the image forming apparatus 30, the type of the alarm is determined, and the printed page count is corrected. In this way, the print system free from page missing in the recovery operation is implemented.

If the alarm indicates an out-of-paper state, all the paper sheet is accumulated in the stacker 35, and there is no difference between the printed page and the transfer complete page. If the alarm indicates paper jamming, there may be a page on which the printing operation is interrupted at the moment of transfer completion. The printed page count is corrected, and the transfer complete page is regarded as a printed page. During recovery, the printing operation resumes on a page next to the transfer complete page to control duplicate printing.

In the context of the specification, the phrase "valid printed page" means that the printed page is at a practical quality level. More specifically, the valid printed page includes a page in which the fixing unit 33 completes the transfer operation on the page at the time of an interruption of the printing operation with the paper sheet not discharged from the sheet discharging unit 34 or a page in which the fixing unit 33 does not complete the fixing operation on the page at the time of the interruption of the printing operation but later completes the fixing operation with the paper sheet discharged after the cause of the interruption is removed. For a given page to be considered as a valid printed page when the paper jamming alarm is triggered, a condition that paper jamming takes place upstream of that page, namely, at a particular location opposed to the sheet discharging unit 34 with respect to the page is to be satisfied. This condition is an example of a predetermined condition for the printed page to be valid. The paper jamming alarm is an example of a fault in medium transportation. In the out-of-paper alarm, there is no valid printed page other than the printed paper sheets.

Figure 3:
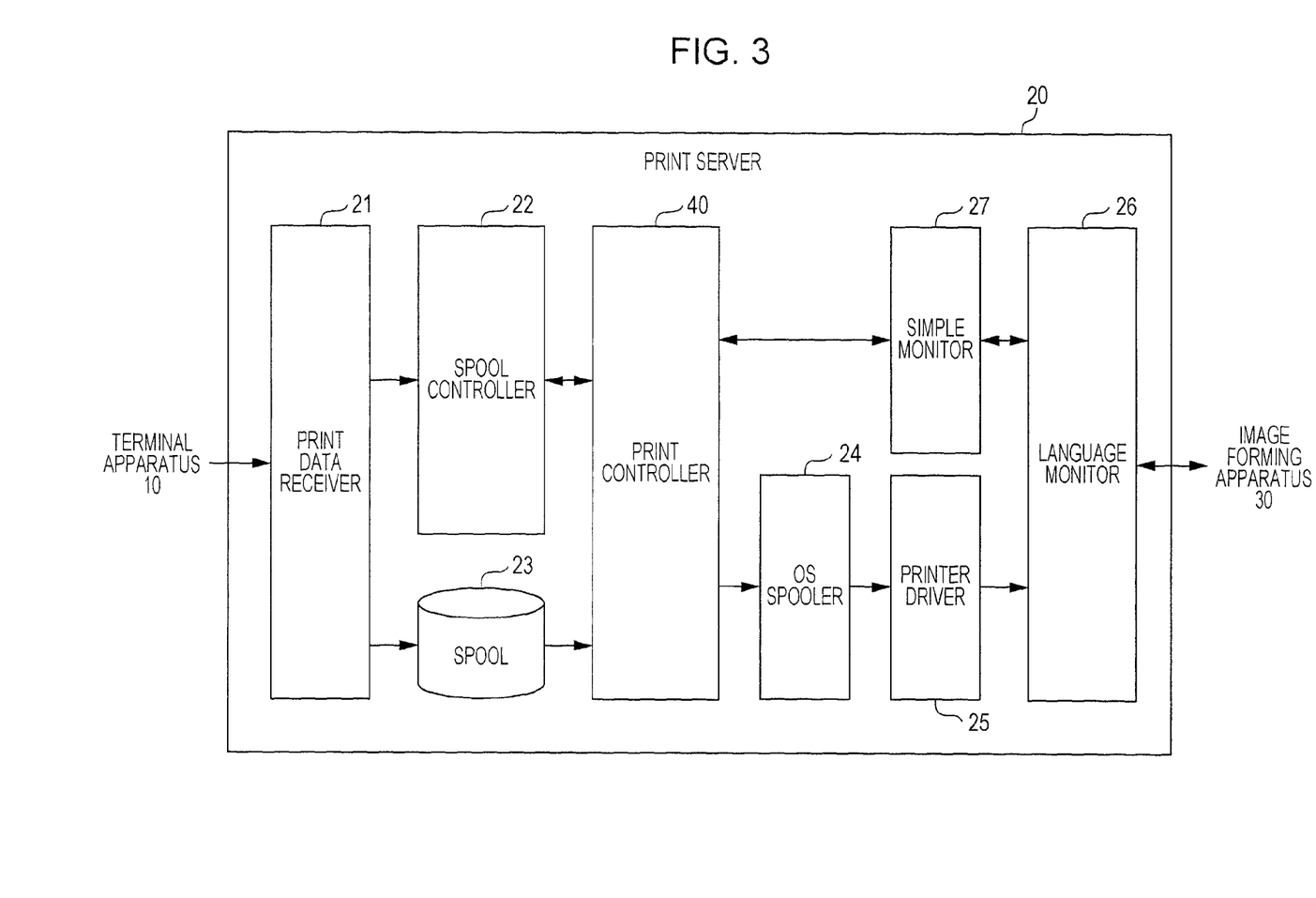
FIG. 3 illustrates a configuration of a print server in the exemplary embodiment of the present invention.

FIG. 3 illustrates a configuration of the print server 20 in the exemplary embodiment of the present invention. Referring to FIG. 3, the print server 20 includes a print data receiver 21, a spool controller 22, a spool 23, an OS spooler 24, a printer driver 25, a language monitor 26, a simple monitor 27, and a print controller 40.

The print data receiver 21 receives the print data from the terminal apparatus 10.

The spool controller 22 manages the print data received by the print data receiver 21 as spool data.

The spool 23 spools the print data received by the print data receiver 21.

The OS spooler 24 is a spooler available by Windows (registered trademark), and spools the print data output from the print controller 40.

The printer driver 25 converts the print data spooled by the OS spooler 24 into print instruction data.

The language monitor 26 communicates with the image forming apparatus 30 in two-way communications. The language monitor 26 transmits the print instruction data, acquires information related to status and alarm from the image forming apparatus 30, and transmits to the image forming apparatus 30 instruction information including a variety of instructions. In the exemplary embodiment, the language monitor 26 is an example of a print instruction unit and has a function of transmitting the print instruction data to the printer. The language monitor 26 is also an example of a resume instruction unit that has a function of retransmitting a part of the print instruction data to the printer after instructing the printer to delete the print instruction data and a function of instructing the printer to resume the printing operation in response to the part of the print instruction data after instructing the print to suspend the printing operation responsive to the print instruction data.

The simple monitor 27 outputs to the print controller 40 the information of status and alarm received from the language monitor 26 and outputs to the language monitor 26 the instruction information received from the print controller 40.

The print controller 40 outputs to the OS spooler 24 the print data the spool 23 has pooled in response to an instruction from the spool controller 22.

Figure 4:
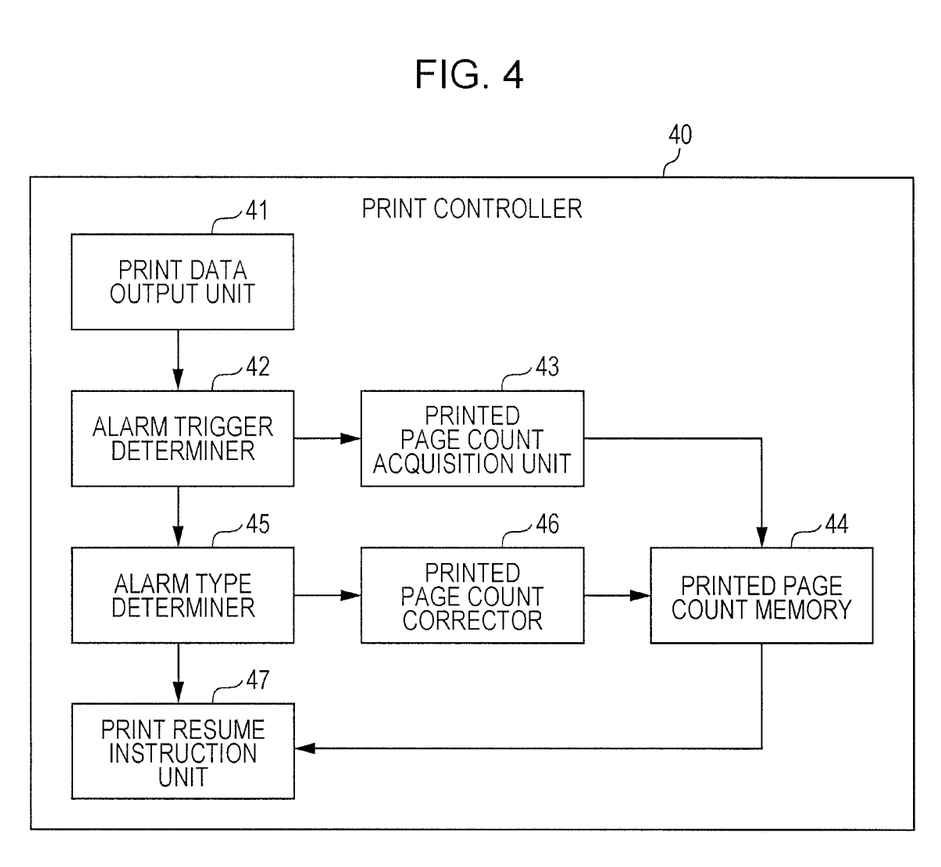
FIG. 4 is a functional block diagram illustrating a print controller in the exemplary embodiment of the present invention.

FIG. 4 is a functional block diagram illustrating the print controller 40 of FIG. 3. Referring to FIG. 4, the print controller 40 includes a print data output unit 41, an alarm trigger determiner 42, a printed page count acquisition unit 43, a printed page count memory 44, an alarm type determiner 45, a printed page count corrector 46, and a print resume instruction unit 47.

The print data output unit 41 outputs the print data read from the spool 23 to the OS spooler 24. In the exemplary embodiment, the print data output unit 41 is an example of the print instruction unit having a function of instructing the printer to print the print data to a medium.

The alarm trigger determiner 42 determines whether an alarm is triggered in the image forming apparatus 30. The determination as to whether an alarm is triggered or not may be performed by determining whether the information of alarm has been acquired from the simple monitor 27. The alarm trigger determiner 42 may also acquire a device status of the image forming apparatus 30 from the simple monitor 27.

The printed page count acquisition unit 43 acquires the printed page count of the image forming apparatus 30. Since the printed page count is transmitted from the image forming apparatus 30 to the simple monitor 27 via the language monitor 26, the printed page count acquisition unit 43 simply acquires the printed page count from the simple monitor 27. Note that a portion of the print data printed on the pages indicated by the printed page count is an example of a first portion of the print data.

The printed page count memory 44 stores the printed page count acquired by the printed page count acquisition unit 43.

If the alarm trigger determiner 42 determines that an alarm has been triggered in the image forming apparatus 30, the alarm type determiner 45 determines based on the information of alarm received from the alarm trigger determiner 42 whether the type of the alarm involves correcting the printed page count. For example, an identification of the alarm and necessity to correct the printed page count are stored in association with each other. The alarm type determiner 45 then determines whether to correct the printed page count depending on the necessity to correct the printed page count associated with the ID of the alarm included in the information of the alarm received from the alarm trigger determiner 42.

If the alarm type determiner 45 determines that the type of the alarm involves correcting the printed page count, the printed page count corrector 46 adds a corrected page count to the printed page count stored on the printed page count memory 44, and overwrites the printed page count on the printed page count memory 44 with the corrected printed page count. Note that a portion of the print data printed on the corrected page indicated by the corrected printed page count is an example of a second portion of the print data. A portion of the print data printed on a page next to the printed page indicated by the corrected printed page count is an example of a third portion of the print data.

The print resume instruction unit 47 instructs the image forming apparatus 30 to resume the printing operation on a page next to the printed page indicated by the printed page count stored on the printed page count memory 44. For example, the print resume instruction unit 47 outputs to the simple monitor 27 delete instruction information instructing the print instruction data to be deleted, or outputs the print instruction data to the OS spooler 24 again. The print resume instruction unit 47 may also output to the simple monitor 27 suspend instruction information instructing the process responsive to the print instruction data to be suspended, or resume instruction information instructing the printing operation to resume. In the exemplary embodiment, the print resume instruction unit 47 is an example of the resume instruction unit having a function of instructing the printer to resume the printing operation.

Figure 5:
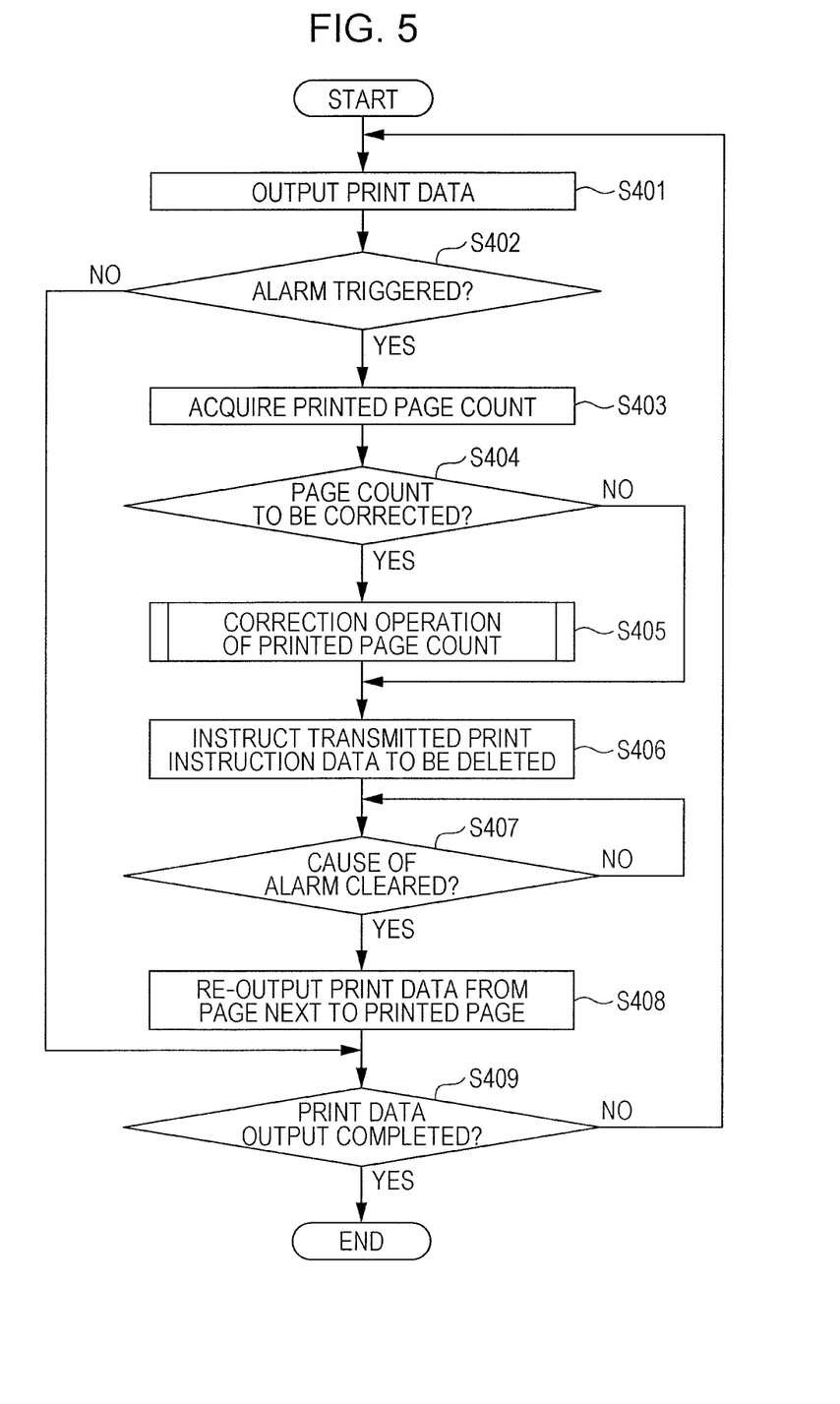
FIG. 5 is a flowchart illustrating a first operational process of the print controller in the exemplary embodiment of the present invention.

FIG. 5 is a flowchart illustrating a first operational process of the print controller 40 in the exemplary embodiment. In the first operational process, the print controller 40 resumes the printing operation by outputting the print data again.

When the first operational process starts, the print data output unit 41 in the print controller 40 retrieves from the spool 23 the print data indicated by the spool controller 22, and outputs the print data to the OS spooler 24 (step S401). The print data is thus transferred to the printer driver 25. The printer driver 25 converts the print data into the print instruction data and then transmits the print instruction data to the image forming apparatus 30 via the language monitor 26.

The alarm trigger determiner 42 determines whether an alarm is triggered in the image forming apparatus 30 (step S402). This determination may be performed by determining whether the information of the alarm has been received from the simple monitor 27. If the alarm trigger determiner 42 determines that an alarm is triggered in the image forming apparatus 30, the information of the alarm is transferred to the alarm type determiner 45.

The printed page count acquisition unit 43 acquires the printed page count (step S403). The printed page count may be acquired from the image forming apparatus 30 via the language monitor 26 and the simple monitor 27, for example. The printed page count is the page count stored on the printed page count memory 44.

The alarm type determiner 45 determines whether the type of the alarm involves correcting the printed page count (step S404). This determination may be performed based on the information of the alarm from the alarm trigger determiner 42.

If the alarm type determiner 45 determines that the type of the alarm involves correcting the printed page count, the printed page count corrector 46 performs a printed page count correction process (step S405). If the alarm indicates paper jamming, the print controller 40 performs the printed page count correction process. The printed page count correction process is described below.

If the alarm type determiner 45 determines that the type of the alarm does not involve correcting the printed page count, the printed page count correction process is not performed. For example, if the alarm indicates the out-of-paper state, the printed page count correction process is not performed.

The print resume instruction unit 47 outputs delete instruction information instructing the print instruction data transmitted to the image forming apparatus 30 in response to the outputting of the print data in step S401 (step S406). The delete instruction information is thus transmitted to the image forming apparatus 30 via the simple monitor 27 and the language monitor 26. The image forming apparatus 30 deletes the print instruction data stored thereon.

The print resume instruction unit 47 determines whether information indicating that the cause of the alarm has been cleared is received (step S407). If an alarm is triggered, the user may clear the cause of the alarm. For example, if the alarm indicates paper jamming, the user may remove a jammed page, and discharge the paper sheet closer to the sheet discharging unit 34 and upstream of the removed page. If the alarm indicates an out-of-paper state, the user may replenish and set the paper sheet to the sheet tray 31. The user then enters to the image forming apparatus 30 the information indicating that the cause of the alarm has been cleared. The print resume instruction unit 47 repeats the operation in step S407 until this information is entered. When this information is entered, processing proceeds to resume the printing operation. Even if the user does not enter the information that the cause of the alarm has been cleared, the image forming apparatus 30 may detect the clearance of the cause of the alarm and resume the printing operation.

The print resume instruction unit 47 references the printed page count stored on the printed page count memory 44 and outputs to the OS spooler 24 the print data for a page next to the page indicated by the printed page count (step S408). The print data is then transferred to the printer driver 25, and the printer driver 25 converts the print data into the print instruction data. The print instruction data is then transmitted to the image forming apparatus 30 via the language monitor 26. As a result, the image forming apparatus 30 resumes the printing operation, starting with a page next to the printed page.

The print resume instruction unit 47 determines whether the print data has been output (step S409). If the print data has not been output, control is handed over to the print data output unit 41 to return to step S401. If it is determined that the print data has been output, the process ends.

Figure 6:
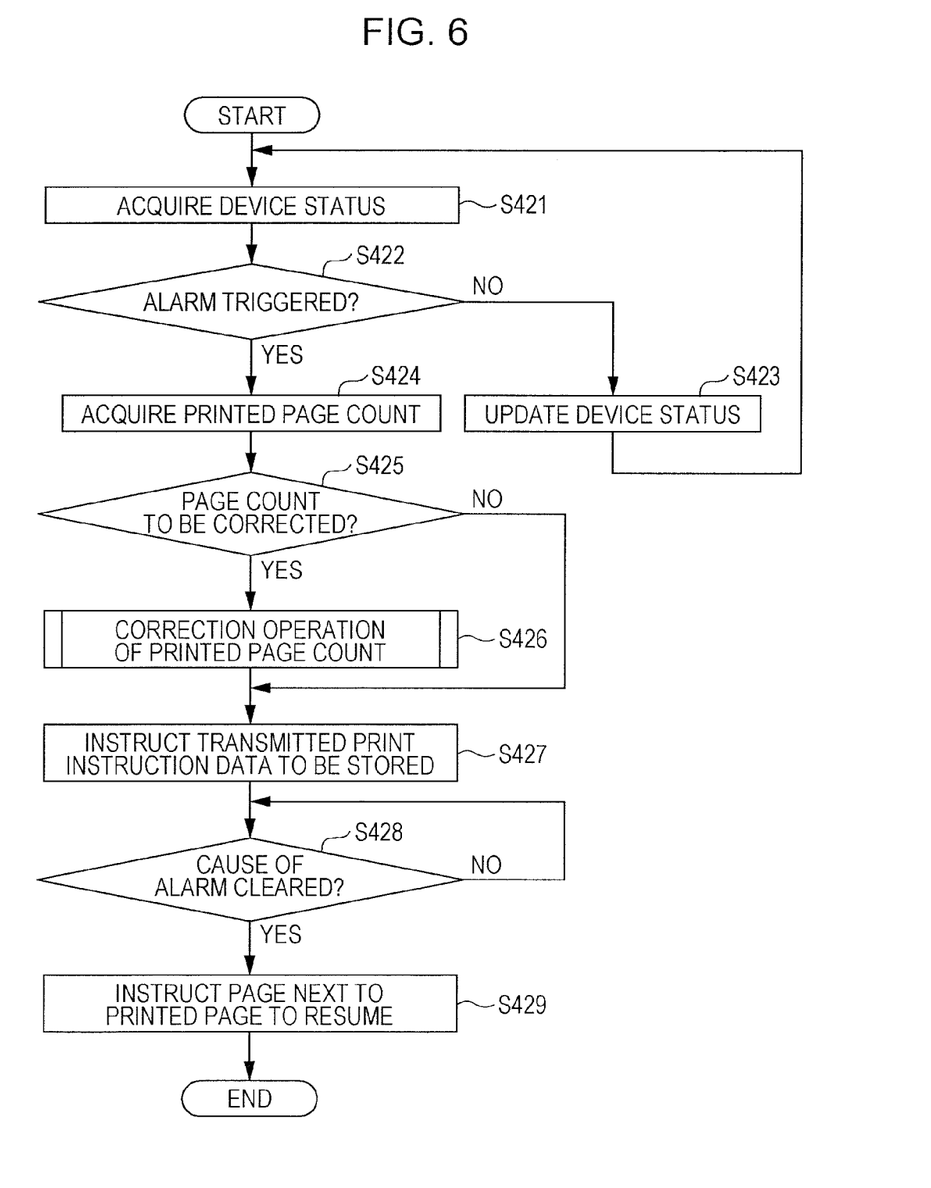
FIG. 6 is a flowchart illustrating a second operational process of the print controller in the exemplary embodiment of the present invention.

FIG. 6 is a flowchart illustrating a second operational process of the print controller 40 in the exemplary embodiment. In the second operational process, the print controller 40 resumes the printing operation by using an operation responsive to the print instruction data of the image forming apparatus 30 after the print data is output. The second operational process of FIG. 6 starts after the print data output unit 41 has output the print data.

With the second operational process starting, the alarm trigger determiner 42 in the print controller 40 acquires a device status of the image forming apparatus 30 (step S421). The device status may be acquired from the image forming apparatus 30 via the language monitor 26 and the simple monitor 27, for example.

The alarm trigger determiner 42 determines whether an alarm has been triggered in the image forming apparatus 30 (step S422). This determination may be performed by determining whether the information of the alarm has been received from the simple monitor 27. If the alarm trigger determiner 42 determines that no alarm has been triggered, the alarm trigger determiner 42 updates the device status of the image forming apparatus 30 (step S423), and then returns to step S421. On the other hand, if the alarm trigger determiner 42 determines that an alarm has been triggered, the information of the alarm is transferred to the alarm type determiner 45.

The printed page count acquisition unit 43 acquires the printed page count (step S424). The printed page count may be acquired from the image forming apparatus 30 via the language monitor 26 and the simple monitor 27, for example. The printed page count thus acquired may be stored on the printed page count memory 44.

The alarm type determiner 45 determines whether the type of the alarm involves correcting the printed page count (step S425). This determination may be performed based on the information of the alarm transferred from the alarm trigger determiner 42.

If the alarm type determiner 45 determines that the type of the alarm involves correcting the printed page count, the printed page count corrector 46 performs a printed page count correction process (step S426). If the alarm indicates paper jamming, the printed page count corrector 46 performs the printed page count correction process. The printed page count correction process is described in detail below.

If the alarm type determiner 45 determines that the type of the alarm does not involve correcting the printed page count, the printed page count correction process is not performed. For example, if the alarm indicates the out-of-paper state, the printed page count correction process is not performed.

The print resume instruction unit 47 outputs suspend instruction information instructing the printing operation responsive to the print instruction data transmitted to the image forming apparatus 30 to be suspended (step S427). The print instruction data is transmitted as a result of the transmission of the print data in advance. The suspend instruction information is transmitted to the image forming apparatus 30 via the simple monitor 27 and the language monitor 26. The image forming apparatus 30 suspends the stored printing operation.

The print resume instruction unit 47 determines whether information that the cause of the alarm has been cleared is input (step S428). If an alarm is triggered, the user may clear the cause of the alarm. For example, if the alarm indicates paper jamming, the user may remove a jammed page, and discharge the paper sheet closer to the sheet discharging unit 34 and upstream of the removed page. If the alarm indicates an out-of-paper state, the user may replenish and set the paper sheet to the sheet tray 31. The user then enters to the image forming apparatus 30 the information indicating that the cause of the alarm has been cleared. The print resume instruction unit 47 repeats the operation in step S428 until this information is entered. When this information is entered, processing proceeds to resume the printing operation. Even if the user does not enter the information that the cause of the alarm has been cleared, the image forming apparatus 30 may detect the clearance of the cause of the alarm and resume the printing operation.

The print resume instruction unit 47 references the printed page count stored on the printed page count memory 44 and outputs resume instruction information instructing the printing operation to start on a page next to the page indicated by the printed page count (step S429). The resume instruction information is transmitted to the image forming apparatus 30 via the simple monitor 27 and the language monitor 26. As a result, the image forming apparatus 30 resumes the suspended printing operation, starting with a page next to the printed page.

The printed page count correction process in step S405 of FIG. 5 and in step S426 of FIG. 6 is described below. First through third printed page count correction processes are described. A print process table commonly used in these processes is described first.

Figure 7:
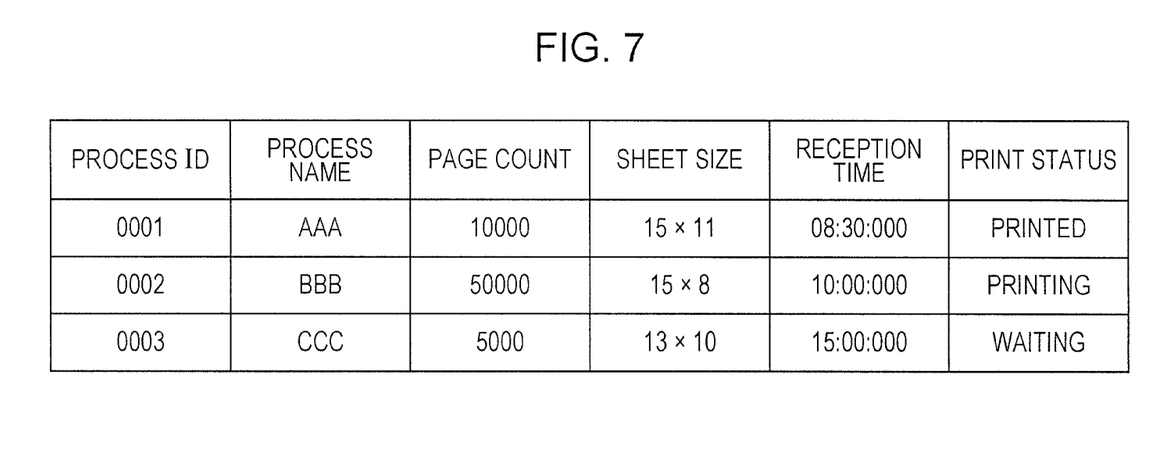
FIG. 7 illustrates an example of contents of a print process table commonly used in first through third printed page count correction processes.

FIG. 7 illustrates an example of contents of the print process table. The print process table associates a process ID, process name, page count, sheet size, reception time, and print status. The sheet size refers to the size of a paper sheet used in the printing operation identified by a corresponding process ID, and has a format of (width perpendicular to a transport direction of the paper sheet)×(page length in the transport direction of the paper sheet). Note that the "page length" in the continuous feed paper sheet is a distance from one perforation to the next perforation.

Figure 8:
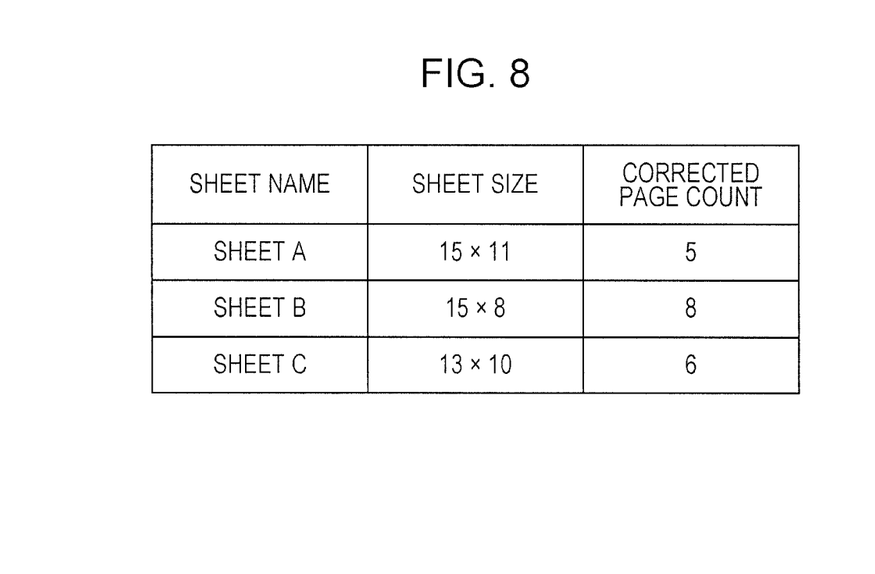
FIG. 8 illustrates an example of the contents of a sheet correction table for use in the first printed page count correction process.

FIG. 8 illustrates an example of the contents of a sheet correction table for use in the first printed page count correction process. As illustrated in FIG. 8, the sheet correction table associates a sheet name, sheet size, corrected page count. The corrected page count is smaller as the page length of the paper sheet in the transport direction is longer. This is because a distance between the transfer unit 32 and the sheet discharging unit 34 in FIG. 2 is a fixed value, and a maximum integer not exceeding a quotient resulting from dividing the distance by the page length in the transport direction is set to be the corrected page count.

Figure 9:
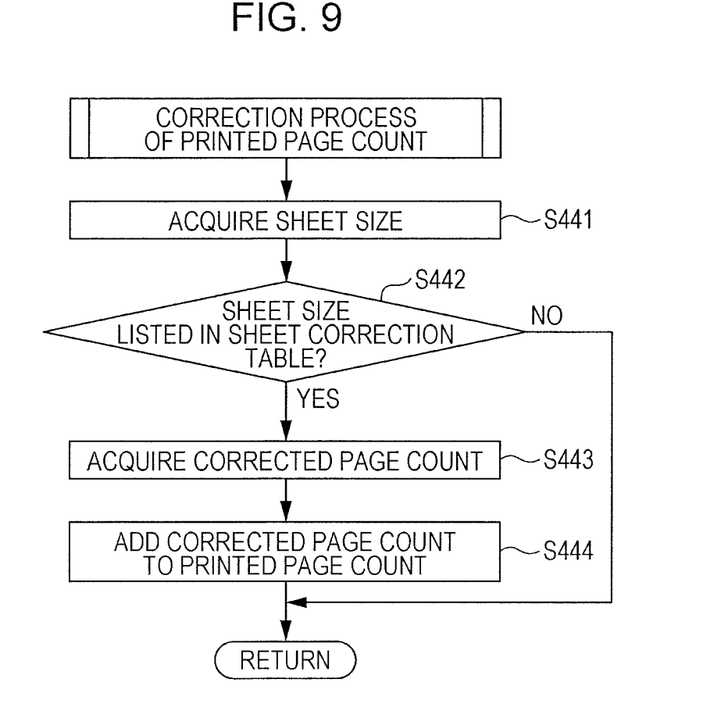
FIG. 9 is a flowchart illustrating the first printed page count correction process.

FIG. 9 is a flowchart illustrating the first printed page count correction process.

In the first printed page count correction process, the printed page count corrector 46 references the print process table to acquire the sheet size used in the printing operation in which an alarm has been triggered (step S441). The printed page count corrector 46 references the sheet correction table to determine whether the sheet size acquired in step S441 is defined in the sheet correction table (step S442).

If the printed page count corrector 46 determines that the sheet size is defined in the sheet correction table, the printed page count corrector 46 acquires the corrected page count associated with the sheet size in the sheet correction table (step S443). The printed page count corrector 46 corrects the printed page count by adding the corrected page count to the printed page count (step S444).

If the printed page count corrector 46 determines that the sheet size is not defined in the sheet correction table, the printed page count corrector 46 ends the process.

In the first printed page count correction process, the print process table stores the sheet size, and the corrected page count is acquired from the sheet correction table according to the sheet size as a key. The exemplary embodiment is not limited to this method. The sheet name may be stored in the print process table, and the corrected page count may be acquired according to the sheet name as a key. In a more general method, information of any media may be stored in the print process table, and the corrected page count may be acquired from the print process table according to the information of the medium as a key.

Figure 10:
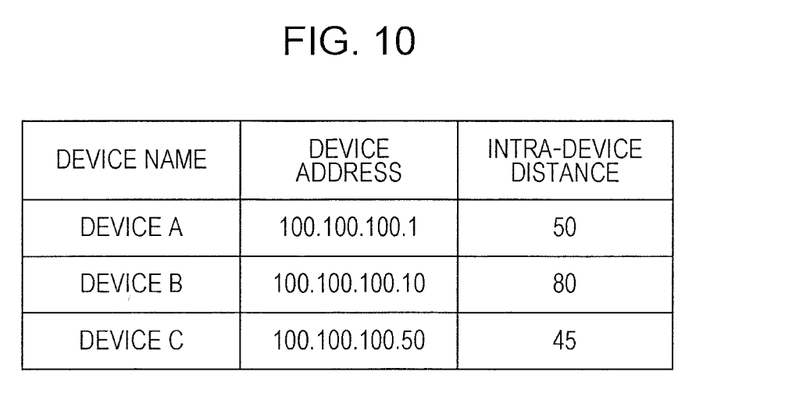
FIG. 10 illustrates the contents of a device information table for use in the second printed page count correction process.

FIG. 10 illustrates the contents of a device information table for use in the second printed page count correction process. As illustrated in FIG. 10, the device information table associates a device name, device address, and intra-device distance. The intra-device distance refers to a distance between the transfer unit 32 and the sheet discharging unit 34 in the image forming apparatus 30 identified by the corresponding device name, and measured in inches.

Figure 11:
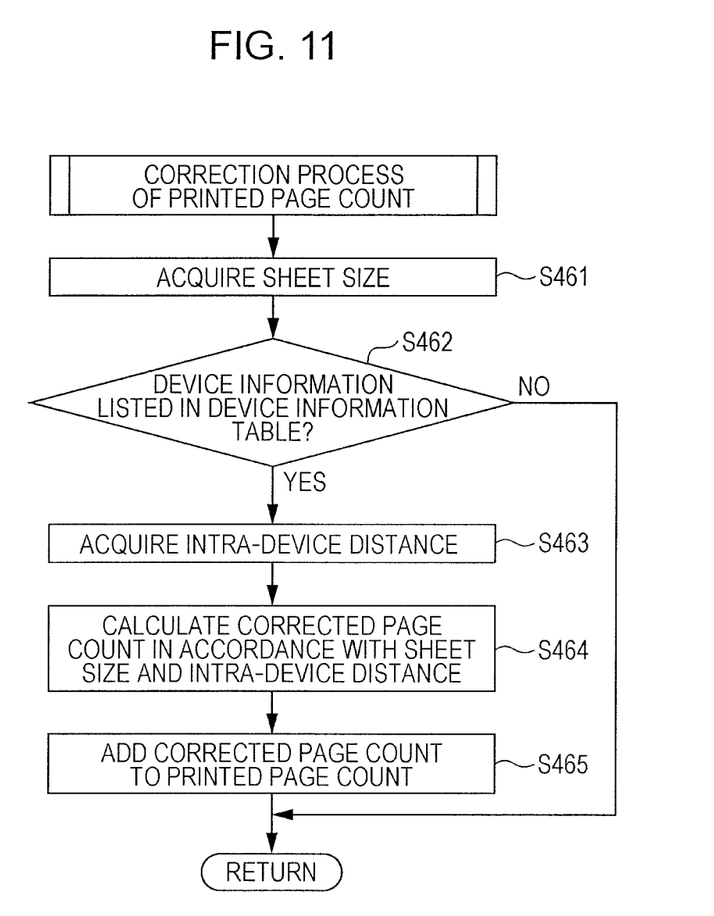
FIG. 11 is a flowchart illustrating the second printed page count correction process.

FIG. 11 is a flowchart illustrating the second printed page count correction process.

In the second printed page count correction process, the printed page count corrector 46 references the print process table, and acquires the sheet size used in the printing operation having triggered an alarm (step S461). The printed page count corrector 46 references the device information table and determines whether the information of the image forming apparatus 30 having triggered the alarm is defined in the device information table (step S462).

If the information of the image forming apparatus 30 having triggered the alarm is defined in the device information table, the printed page count corrector 46 acquires the intra-device distance associated with the device name of the image forming apparatus 30 in the device information table (step S463). The printed page count corrector 46 then calculates the corrected page count based on the sheet size acquired in step S461 and the intra-device distance acquired in step S463 (step S464). More specifically, a maximum integer not exceeding a quotient resulting from dividing the intra-device distance by the page length in the transport direction is set to be the corrected page count. The printed page count corrector 46 performs the page count correction by adding the corrected page count to the printed page count (step S465).

If the information of the image forming apparatus 30 having triggered the alarm is not defined in the device information table, the printed page count corrector 46 ends the process.

Figure 12:
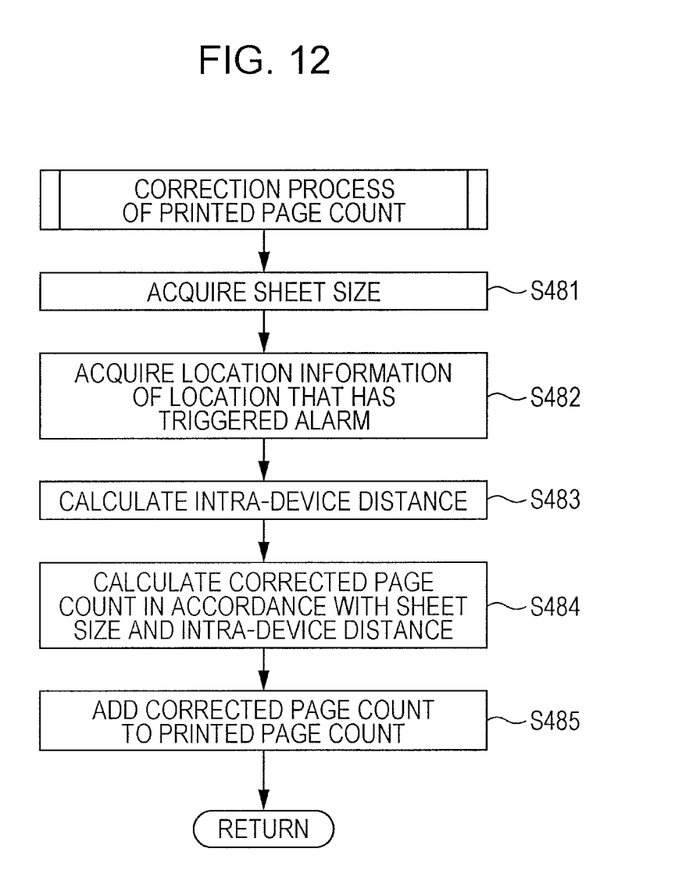
FIG. 12 is a flowchart illustrating the third printed page count correction process.

FIG. 12 is a flowchart illustrating the third printed page count correction process.

In the third printed page count correction process, the printed page count corrector 46 references the print process table, and acquires the sheet size used in the printing operation having triggered an alarm (step S481). The printed page count corrector 46 acquires location information related to a location where the alarm is triggered in the image forming apparatus 30 (step S482). The location information may be acquired by a sensor that may be arranged in the image forming apparatus 30 to detect the paper sheet. The printed page count corrector 46 calculates the intra-device distance between the location where the alarm has been triggered in the image forming apparatus 30 to the preset location of the stacker 35, based on the location information acquired in step S482 and the location information indicating the location of the stacker 35 (step S483). The printed page count corrector 46 then calculates the corrected page count based on the sheet size acquired in step S481 and the intra-device distance calculated in step S483 (step S484). More specifically, a maximum integer not exceeding a quotient resulting from dividing the intra-device distance by the page length in the transport direction is set to be the corrected page count. The printed page count corrector 46 performs the page count correction by adding the corrected page count to the printed page count (step S485).

Figure 13:
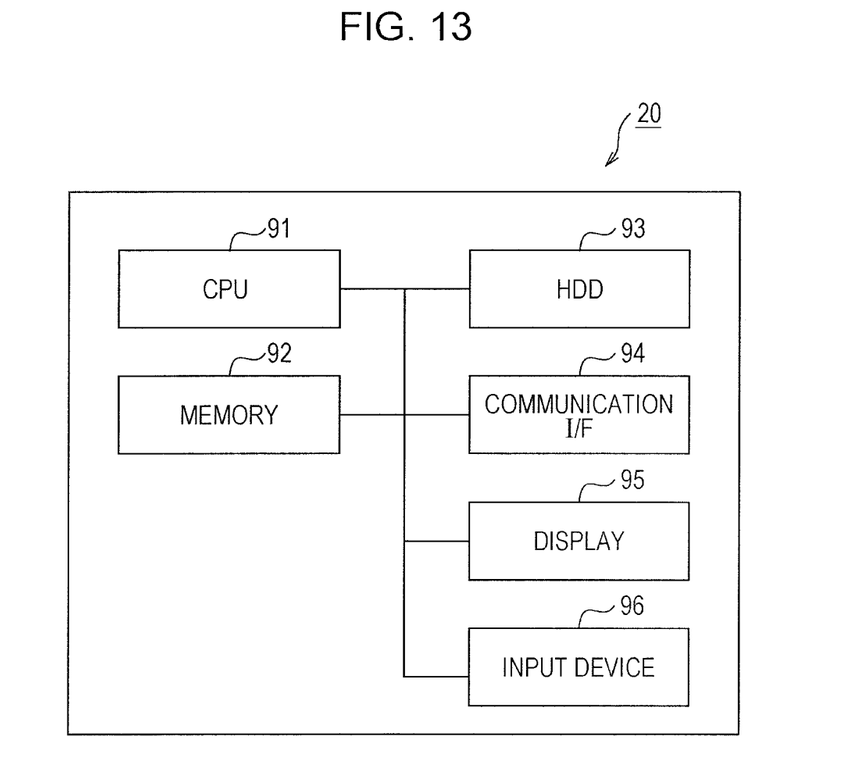
FIG. 13 illustrates a hardware configuration of a print server in the exemplary embodiment of the present invention.

FIG. 13 illustrates a hardware configuration of the print server 20 in the exemplary embodiment. Referring to FIG. 13, the print server 20 includes a central processing unit (CPU) 91 as a processor, a memory 92 as a storage device, and a hard disk drive (HDD) 93. The CPU 91 executes a variety of software programs including an operating system (OS), and applications to perform the processes described above. The memory 92 stores the variety of software programs and data for use in the software programs. The HDD 93 stores data input to the software programs and data output from the software programs. The memory 92 and/or the HDD 93 implements each memory described above. The print server 20 further includes the communication interface (I/F) 94, a display 95 including a video memory and a display, and an input device 96, such as a keyboard or a mouse.

In the exemplary embodiment, the print server 20 resumes the printing operation when the image forming apparatus 30 is restored from an interruption subsequent to the occurrence of the interruption. The present invention is not limited to this method. The image forming apparatus 30 itself may resume the printing operation. In such a case, the print control function of the image forming apparatus 30 serves as an example of the print control apparatus, and the printing function of the image forming apparatus 30 serves as an example of the printer.

In the exemplary embodiment, the printing operation resumes on a page next to the printed page subsequent to the recovery operation of removing the cause of the alarm during the printing operation. If the pages from the printed page to the transferred page are valid, the number of these valid pages are added to the printed page count. In this way, the possibility of duplicate printing is lowered.

In the exemplary embodiment, the pages from the printed page to the transferred page are determined to be invalid depending on the type of alarm. The printing operation thus resumes on a page next to the printed page. In this way, the possibility of the occurrence of missing pages is lowered.

The program implementing the exemplary embodiment may be supplied not only via a communication medium but also in a recorded state on a recording medium such as a compact disk ROM (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus including at least one processor, the apparatus comprising:
   at least one memory comprising computer executable instructions,
   wherein the at least one processor configured to read and execute the computer executable instructions to implement:
      a print instruction unit configured to instruct a printer to print data on a medium; and
      a resume instruction unit configured to, in response to an interruption occurring in a printing operation after the printer has printed a first portion of the print data onto the medium, instruct the printer to resume the printing operation, subsequent to a clearance of the interruption with the printing operation of a third portion of the print data subsequent to a second portion onto the medium, which is not discharged from the printer, if a predetermined condition to validate the printing operation of the second portion of the print data subsequent to the first portion is satisfied,
   wherein the second portion of the print data is a portion of the print data that is printed on a corrected page indicated by a corrected printed page count.

2. The print control apparatus according to claim 1, wherein the print instruction unit is configured to instruct the printer to print the print data by transmitting, to the printer, print instruction data that instructs the printer to print the print data onto the medium, and
   wherein the resume instruction unit is configured to instruct the printer to resume the printing operation by retransmitting to the printer a part of the print instruction data that instructs the printer to print the third portion of the print data after instructing the printer to delete the print instruction data.

3. The print control apparatus according to claim 1, wherein the print instruction unit is configured to instruct the printer to print the print data by transmitting, to the printer, print instruction data that instructs the printer to print the print data onto the medium, and
   wherein the resume instruction unit is configured to instruct the printer to resume the printing operation in response to a part of the print instruction data that instructs the printer to print the third portion of the print data after instructing the printer to suspend the printing operation responsive to the print instruction data.

4. The print control apparatus according to claim 1, the resume instruction unit is configured to instruct the printer to resume the printing operation to print the second portion of the print data onto the medium subsequent to the clearance of the interruption if the predetermined condition is not satisfied.

5. The print control apparatus according to claim 1, wherein the predetermined condition is that the printing operation is interrupted by an occurrence of a fault in medium transportation at a particular location opposed to a discharge location where the medium having the first portion of the print data printed thereon is discharged, with respect to a transit position of the medium being transported and having the second portion of the print data printed thereon.

6. The print control apparatus according to claim 5, wherein the particular location is a transfer location where a printing agent for use in the printing operation is transferred to the medium, and
   wherein the resume instruction unit is configured to use as the second portion a number of pages that fit in a distance between the transfer location defined in advance with respect to information related to the medium used in the printing operation and the discharge location.

7. The print control apparatus according to claim 5, wherein the particular location is a transfer location where a printing agent for use in the printing operation is transferred to the medium, and
   wherein the resume instruction unit is configured to use as the second portion a number of pages that fit in a distance between the transfer location and the discharge location defined in advance on the printer, the number of pages being determined by a page length of the medium in a transport direction used in the printing operation.

8. The print control apparatus according to claim 5, wherein the resume instruction unit is configured to use as the second portion a number of pages that fit in a distance between the transfer location and the discharge location and are determined by a page length of the medium in a transport direction used in the printing operation.

9. A print system comprising:
   a printer configured to perform a printing operation; and
   a print control apparatus including at least one processor, the apparatus configured to control the printing operation of the printer,
   wherein the print control apparatus includes at least one memory comprising computer executable instructions, and
   wherein the at least one processor configured to read and execute the computer executable instructions to implement:
      a print instruction unit that is configured to instruct the printer to print print data on a medium, and
      a resume instruction unit that, in response to an interruption occurring in a printing operation after the printer has printed a first portion of the print data onto the medium, is configured to instruct the printer to resume the printing operation subsequent to a clearance of the interruption with the printing operation of a third portion of the print data subsequent to a second portion onto the medium, which is not discharged from the printer, if a predetermined condition to validate the printing operation of the second portion of the print data subsequent to the first portion is satisfied,
   wherein the second portion of the print data is a portion of the print data that is printed on a corrected page indicated by a corrected printed page count.

10. A print control method comprising:
    instructing, performed by at least one processor, a printer to print data on a medium; and in response to an interruption occurring in a printing operation after the printer has printed a first portion of the print data onto the medium, instructing, performed by the at least one processor, the printer to resume the printing operation subsequent to a clearance of the interruption with the printing operation of a third portion of the print data subsequent to a second portion onto the medium, which is not discharged from the printer, if a predetermined condition to validate the printing operation of the second portion of the print data subsequent to the first portion is satisfied, wherein the second portion of the print data is a portion of the print data that is printed on a corrected page indicated by a corrected printed page count.

11. A non-transitory computer readable medium storing a program causing a computer to execute a process for controlling a printer, the process comprising:

instructing, performed by at least one processor, the printer to print data on a medium; and in response to an interruption occurring in a printing operation after the printer has printed a first portion of the print data onto the medium, instructing, performed by the at least one processor, the printer to resume the printing operation, subsequent to a clearance of the interruption with the printing operation, of a third portion of the print data subsequent to a second portion onto the medium, which is not discharged from the printer, if a predetermined condition to validate a printing operation of the second portion of the print data subsequent to the first portion is satisfied, wherein the second portion of the print data is a portion of the print data that is printed on a corrected page indicated by a corrected printed page count.

* * * * *